(12) United States Patent
Hayes et al.

(10) Patent No.: US 9,391,903 B2
(45) Date of Patent: Jul. 12, 2016

(54) METHODS AND APPARATUSES FOR DISTRIBUTED PACKET FLOW CONTROL

(71) Applicant: Calix, Inc., Petaluma, CA (US)

(72) Inventors: Timothy Hayes, Santa Barbara, CA (US); Brower Dimond, Petaluma, CA (US)

(73) Assignee: Calix, Inc., Petaluma, CA (US)

( * ) Notice: Subject to any disclaimer, the term of this patent is extended or adjusted under 35 U.S.C. 154(b) by 347 days.

(21) Appl. No.: 13/941,678

(22) Filed: Jul. 15, 2013

(65) Prior Publication Data

US 2015/0016247 A1 Jan. 15, 2015

(51) Int. Cl.
*H04L 12/801* (2013.01)
*H04L 29/06* (2006.01)
*H04N 21/2381* (2011.01)

(52) U.S. Cl.
CPC ........... *H04L 47/127* (2013.01); *H04L 65/4069* (2013.01); *H04L 65/604* (2013.01); *H04N 21/2381* (2013.01)

(58) Field of Classification Search
CPC . H04L 47/127; H04L 65/604; H04L 65/4069; H04N 21/2381
See application file for complete search history.

(56) References Cited

U.S. PATENT DOCUMENTS

| | | | | |
|---|---|---|---|---|
| 5,500,899 A * | 3/1996 | Snow | ...................... | H04L 9/055 380/260 |
| 6,389,468 B1 * | 5/2002 | Muller | ................ | H04L 67/1002 709/226 |
| 6,567,861 B1 * | 5/2003 | Kasichainula | .......... | G06F 9/548 709/246 |
| 6,681,232 B1 | 1/2004 | Sistanizadeh et al. | | |
| 6,957,269 B2 * | 10/2005 | Williams | ............ | H04L 12/5602 370/230 |
| 7,065,779 B1 * | 6/2006 | Crocker | ............... | H04N 21/242 725/111 |
| 7,711,844 B2 * | 5/2010 | Schuehler | ............... | H04L 43/18 709/223 |
| 7,725,919 B1 * | 5/2010 | Thiagarajan | ............. | H04N 5/76 725/101 |
| 7,817,549 B1 | 10/2010 | Kasralikar et al. | | |
| 7,869,428 B2 * | 1/2011 | Shake | ....................... | H04L 1/08 370/389 |
| 8,005,012 B1 * | 8/2011 | Aybay | ..................... | H04L 43/02 370/232 |
| 8,027,305 B1 * | 9/2011 | Rogers | ................... | H04W 48/20 370/331 |

(Continued)

OTHER PUBLICATIONS

Baruch, Z., et al., "Embedded System for Network Flow Identification", Automation, Quality and Testing, Robotics, 2006 IEEE International Conference on , vol. 1, (May 2006), 426,429, 25-28.

(Continued)

*Primary Examiner* — Andrew Lai
*Assistant Examiner* — Hoyet H. Andrews, III
(74) *Attorney, Agent, or Firm* — Schwegman Lundberg & Woessner, P.A.

(57) ABSTRACT

Techniques for network packet flow management are described herein. For example, example methods may include receiving, at a first network device, a first flow identifier that identifies a first content of a first packet flow and a second flow identifier that identifies a second content of a second packet flow, wherein the first flow identifier and the second flow identifier are generated by a second network device. Such methods may also include receiving priority information indicating that the first content has a first priority and that the second content has a second priority that is lower than the first priority. Moreover, example methods may include transmitting the first packet flow and a modified second packet flow that includes the priority information to one or more other network devices.

25 Claims, 7 Drawing Sheets

(56) References Cited

U.S. PATENT DOCUMENTS

| | | | | |
|---|---|---|---|---|
| 8,046,479 B2* | 10/2011 | Einarsson | H04N 7/17318 | 709/217 |
| 8,085,775 B1* | 12/2011 | Pappu | H04L 47/2441 | 370/392 |
| 8,238,241 B2* | 8/2012 | Samuels | H04L 12/24 | 370/230.1 |
| 8,310,934 B2* | 11/2012 | Hou | H04L 47/266 | 370/235 |
| 8,339,954 B2 | 12/2012 | Dahod | | |
| 8,718,131 B2* | 5/2014 | Park | H04L 47/10 | 375/240.01 |
| 8,850,590 B2* | 9/2014 | Kellerman | H04L 9/3247 | 380/260 |
| 8,867,529 B2* | 10/2014 | Pearce | H04L 47/52 | 370/328 |
| 2003/0188252 A1* | 10/2003 | Kim | H04L 1/0046 | 714/779 |
| 2003/0198189 A1 | 10/2003 | Roberts et al. | | |
| 2004/0030745 A1* | 2/2004 | Boucher | H04L 12/5693 | 709/203 |
| 2004/0141530 A1* | 7/2004 | Spio | H04B 7/18543 | 370/535 |
| 2005/0094726 A1* | 5/2005 | Park | H04N 21/234327 | 375/240.08 |
| 2007/0006293 A1* | 1/2007 | Balakrishnan | H04L 63/0245 | 726/13 |
| 2007/0121615 A1* | 5/2007 | Weill | H04L 12/4633 | 370/389 |
| 2007/0220251 A1 | 9/2007 | Rosenberg et al. | | |
| 2008/0013542 A1* | 1/2008 | Youm | H04L 29/06027 | 370/395.3 |
| 2008/0056153 A1* | 3/2008 | Liu | H04L 12/2602 | 370/252 |
| 2008/0201733 A1* | 8/2008 | Ertugrul | G06F 17/30867 | 725/32 |
| 2009/0022134 A1* | 1/2009 | Chun | H04W 28/06 | 370/342 |
| 2009/0119722 A1* | 5/2009 | VerSteeg | H04N 21/234381 | 725/87 |
| 2009/0241170 A1* | 9/2009 | Kumar | H04L 47/10 | 726/3 |
| 2009/0287807 A1* | 11/2009 | Sueyoshi | G06F 9/54 | 709/223 |
| 2010/0043068 A1* | 2/2010 | Varadhan | H04L 12/4633 | 726/15 |
| 2010/0088756 A1* | 4/2010 | Balakrishnan | H04L 63/0245 | 726/13 |
| 2010/0103837 A1* | 4/2010 | Jungck | H04L 29/12066 | 370/252 |
| 2010/0138920 A1 | 6/2010 | Kim et al. | | |
| 2011/0022721 A1* | 1/2011 | Diab | H04L 69/08 | 709/233 |
| 2011/0032951 A1* | 2/2011 | Butler | H04L 12/5601 | 370/474 |
| 2011/0107379 A1* | 5/2011 | Lajoie | H04L 65/1016 | 725/87 |
| 2011/0110382 A1* | 5/2011 | Jabr | H04L 47/125 | 370/422 |
| 2011/0113218 A1* | 5/2011 | Lee | G06F 9/46 | 712/18 |
| 2011/0158146 A1* | 6/2011 | Poola | H04L 12/189 | 370/312 |
| 2011/0216774 A1* | 9/2011 | Nevil | H04L 12/56 | 370/395.7 |
| 2011/0255408 A1* | 10/2011 | Aybay | H04L 43/02 | 370/235 |
| 2011/0295983 A1* | 12/2011 | Medved | H04L 45/00 | 709/220 |
| 2011/0317557 A1* | 12/2011 | Siddam | H04W 28/16 | 370/232 |
| 2012/0014282 A1* | 1/2012 | Pappu | H04L 47/2441 | 370/253 |
| 2012/0243871 A1 | 9/2012 | Huang et al. | | |
| 2012/0317276 A1 | 12/2012 | Muniraju | | |
| 2013/0024901 A1 | 1/2013 | Sharif-Ahmadi et al. | | |
| 2014/0056182 A1 | 2/2014 | Chai | | |
| 2014/0269403 A1 | 9/2014 | Anghel et al. | | |
| 2015/0036533 A1 | 2/2015 | Sodhi et al. | | |
| 2015/0085678 A1 | 3/2015 | Dimond et al. | | |

OTHER PUBLICATIONS

"U.S. Appl. No. 13/955,864, Examiner Interview Summary mailed May 26, 2015", 3 pgs.

"U.S. Appl. No. 13/955,864, Non Final Office Action mailed Mar. 25, 2015", 18 pgs.

"U.S. Appl. No. 13/955,864, Response filed May 19, 2015 to Non Final Office Action mailed Mar. 25, 2015", 13 pgs.

"U.S. Appl. No. 14/034,282, Non Final Office Action mailed Jun. 1, 2015", 22 pgs.

"U.S. Appl. No. 14/034,282, Response filed May 5, 2015 to Restriction Requirement mailed Mar. 5, 2015", 8 pgs.

"U.S. Appl. No. 14/034,282, Restriction Requirement mailed Mar. 5, 2015", 7 pgs.

"U.S. Appl. No. 13/955,864, Advisory Action mailed Oct. 29, 2015", 4 pgs.

"U.S. Appl. No. 13/955,864, Final Office Action mailed Jul. 15, 2015", 23 pgs.

"U.S. Appl. No. 13/955,864, Response filed Sep. 23, 2015 to Final Office Action mailed Jul. 15, 2015", 12 pgs.

"U.S. Appl. No. 13/955,864, Response filed Nov. 3, 2015 to Advisory Action mailed Oct. 29, 2015", 13 pgs.

"U.S. Appl. No. 14/034,282, Notice of Allowance mailed Oct. 13, 2015", 7 pgs.

"U.S. Appl. No. 14/034,282, Response filed Sep. 1, 2015 to Non Final Office Action mailed Jun. 1, 2015", 9 pgs.

* cited by examiner

METHODS AND APPARATUSES FOR DISTRIBUTED PACKET FLOW CONTROL

TECHNICAL FIELD

This disclosure relates generally to network communications and in particular to methods and apparatuses for distributed packet flow control.

BACKGROUND

To determine the nature and content of data packets that traverse an access network, network providers often perform deep packet inspection ("DPI") on these packets. In DPI, the data portion of inspected packets are analyzed at an inspection point to determine whether the packet may continue to its intended recipient or whether the packet should be rerouted to avert, for example, security, congestion, or network compatibility issues.

In legacy access networks, deep packet inspection and related functions, such as network analytics and security management, are performed by computationally robust devices that are typically located at the interface of the core network (e.g. the Internet) and the access network. These devices are often charged with performing DPI for each network flow associated with the access network, which may include flows associated with a bevy of smaller localized access networks, such as home, office, or other local area networks (LANs). Thus, in legacy access networks, these DPI-performing devices are necessarily computationally robust and, therefore, expensive. Thus, methods and apparatuses for distributed packet flow control in access networks are needed.

SUMMARY

As described above, DPI devices of legacy access networks are typically centralized at the interface of the core network and the access network, and therefore are large and often prohibitively expensive. In general, the present disclosure describes techniques for distributed packet flow identification and control. Using various techniques of this disclosure, one or more packet inspection points located at network devices spread throughout the access network, such as at one or more residential gateways or optical line devices, may identify the contents of packet flows traversing the individual network devices, prioritize the packet flows, and transmit the priority information to one or more other network devices. Based on this priority information and network congestion information, the one or more other network devices may alter (e.g. drop, queue, buffer, mark for retransmission, or otherwise delay, such as by rate limiting or rate shaping) the flow of packets associated with a packet flow of low priority before altering packets associated with a packet flow of higher priority. As such, the access network may limit congestion to ensure that the packet flow of higher priority maintains an acceptable quality of service in spite of the presence of network congestion.

In one example, this disclosure is directed to a method of network packet flow management executed by a computing device. The method comprises receiving, at a first network device, a first flow identifier that identifies a first content of a first packet flow and a second flow identifier that identifies a second content of a second packet flow, wherein the first flow identifier and the second flow identifier are generated by a second network device. In addition, the method includes receiving, at the first network device, priority information indicating that the first content has a first priority and that the second content has a second priority that is lower than the first priority. Furthermore, the method includes transmitting, by the first network device, the first packet flow and a modified second packet flow that includes the priority information to one or more other network devices.

Additionally, the disclosure presents an apparatus for controlling packet flow in a network, comprising one or more modules that are configured to perform the acts of receiving, at a first network device, a first flow identifier that identifies a first content of a first packet flow and a second flow identifier that identifies a second content of a second packet flow, wherein the first flow identifier and the second flow identifier are generated by a second network device, receiving, at the first network device, priority information indicating that the first content has a first priority and that the second content has a second priority that is lower than the first priority, and transmitting, by the first network device, the first packet flow and a modified second packet flow that includes the priority information to one or more other network devices.

Furthermore, the present disclosure describes at least one machine readable medium comprising a plurality of instructions that in response to being executed on a computing device, cause the computing device to perform the acts of receiving, at a first network device, a first flow identifier that identifies a first content of a first packet flow and a second flow identifier that identifies a second content of a second packet flow, wherein the first flow identifier and the second flow identifier are generated by a second network device, receiving, at the first network device, priority information indicating that the first content has a first priority and that the second content has a second priority that is lower than the first priority, and transmitting, by the first network device, the first packet flow and a modified second packet flow that includes the priority information to one or more other network devices.

DETAILED DESCRIPTION

This disclosure provides methods and apparatuses for improved packet flow management in an access network. In some examples, such methods and apparatuses may include a network device receiving one or more packets of a plurality of packet flows and priority information associated with each of the packet flows. For example, a father in a household may wish to ensure that his streaming sports media service remains uninterrupted during periods of network congestion—even if that means that his children's music streaming program service may be halted during such periods. In such a scenario, the father may indicate (e.g. via a program executed by a computer terminal connected to the access network) that the streaming sports media service flow has a higher priority than the music streaming program flow. In such an example, this input may be processed by the user terminal or another device and transmitted to the network device as the priority information associated with a first flow (e.g. the streaming sports media) and a second flow (e.g. the music streaming program flow). In some examples, the program may be configured to automatically determine and/or set relative priorities of program flows.

The network device may modify the packets of one or more of the packet flows to indicate the corresponding priority of the packets in relation to other packet flows and may transmit the packets, as well as the priority information, to one or more other network elements of the access network. These network elements, which are located at disparate access network locations, may store the priority information and may use the priority information to determine which packets should be altered (e.g. dropped, queued, buffered, marked for retransmission, or otherwise delayed, such as by rate limiting or rate shaping) during periods of network congestion. For example, a network element may obtain an indication that network congestion exists and may alter one or more packets associated with the music streaming program flow (the lower priority flow) before altering any packets of packet flows associated with the streaming sports media flow (the higher priority flow) based on the received priority information. As such, flows may be identified, prioritized, altered, or otherwise controlled at disparate network locations, reducing or eliminating the need for expensive, power-intensive legacy DPI hardware at a single access network location.

Figure 1:
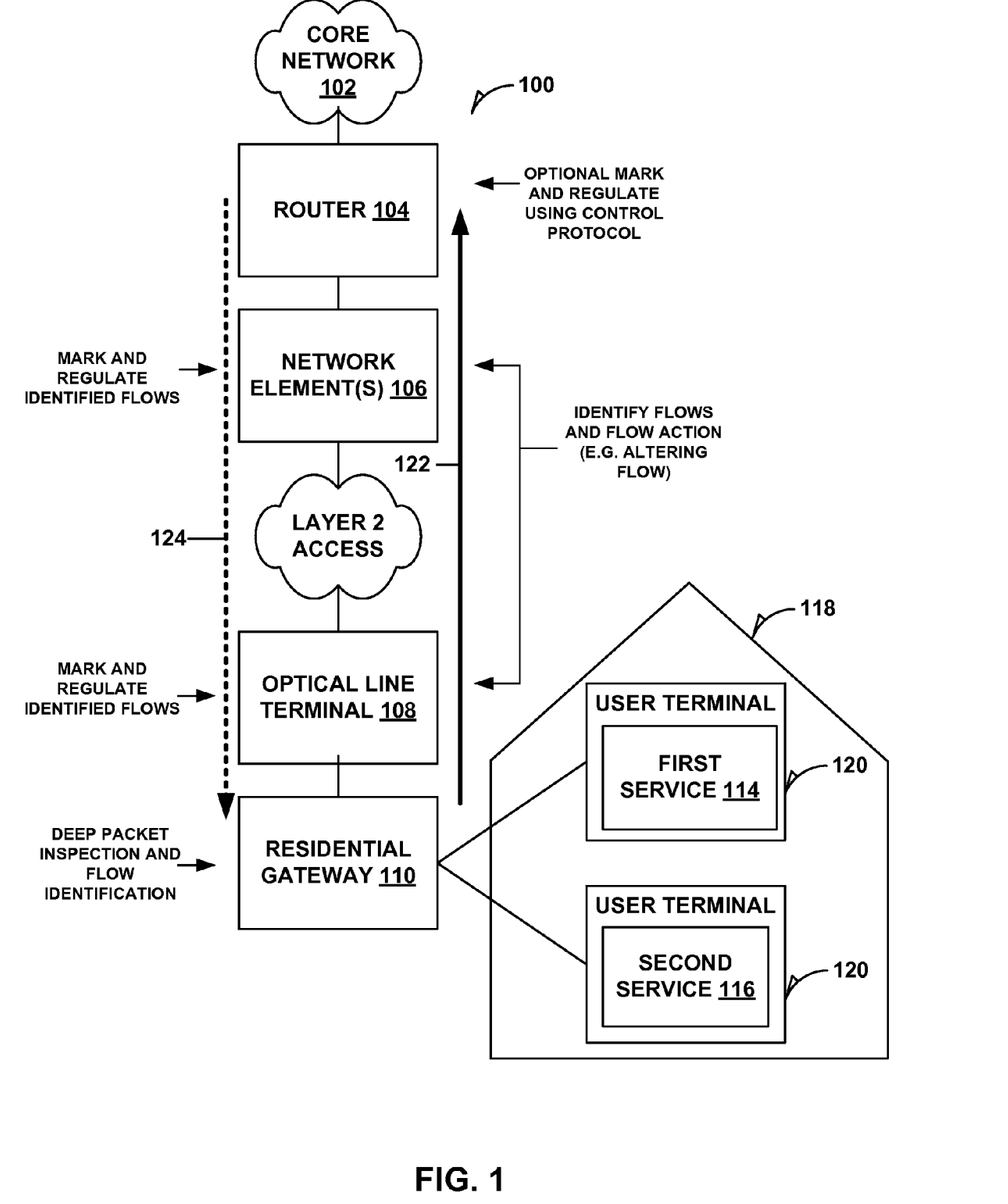
FIG. 1 is a schematic diagram illustrating an example access network for improved packet flow management as described in the present disclosure.

FIG. 1 illustrates an example access network 100 for improved packet flow control according to the present disclosure. In an aspect, access network 100 may provide communication services (e.g. Internet or telephonic services) to one or more user terminals 120 serviced by the access network. For example, access network 100 may include one or more network devices, such as, but not limited to, a residential gateway 100, optical line terminal 108, one or more devices providing layer 2 communication access, one or more network elements 106 (e.g. switches, routing components, etc.) and/or a router 104.

In some examples, residential gateway 110 may be configured to receive one or more packet flows associated with one or more user terminals 120. Upon receiving these one or more packet flows, the residential gateway 110 may perform DPI on the packets of the one or more packet flows and, in some examples, may identify the flows (whether flowing upstream or downstream in the access network 100) according to their content (e.g. music streaming data, video streaming, etc.). This flow identification function, however, is not limited to the residential gateway. As indicated in FIG. 1, optical line terminal 108, network elements 106, and/or router 104 may identify, mark, and/or modify flows according to their content. Furthermore, residential gateway 110 may be configured to receive priority information associated with the flows, which may indicate whether a particular packet flow, for example, should be altered before a different packet flow is altered if the network becomes congested. Residential gateway 110 may be further configured to share this priority information with one or more other network devices of the access network 100, such as optical line terminal 108, which, in turn, may further transmit the priority information on to other network devices.

Based on this priority information and/or the flow identification information, one or more network devices (e.g. network elements 106, optical line terminal 108, or even router 104 or residential gateway 110) may regulate the identified flows and/or perform some kind of action on the flows based, for example, on obtaining an indication of network congestion. As such, access network may identify, prioritize, and alter one or more packet flows at disparate locations to allow improved flow control at various network locations.

Additionally, access network 100 may comprise an Ethernet network, an optical network, such as a passive optical network (PON) or an active optical network (AON), Gigabit-capable PON (GPON), or any other communication access network, optical or otherwise, known by one of ordinary skill in the art. Furthermore, access network 100 may provide communication services to the one or more user terminals 114 of an end user group 118 (e.g. a household, apartment building, or other delineated service group) via one of a bevy of network topologies, including, but not limited to tree, ring, star, mesh, bus, fiber to the curb (FTTC), fiber to the neighborhood (FTTN), fiber to the premises (FTTP), fiber to the home (FTTH), fiber to the X (FTTX) or any other network topology, architecture, or sub-architecture known to one of ordinary skill in the art. Additionally, access network 100 and/or core network 102 may include any network type, such as, but not limited to, wide-area networks (WAN), wireless networks (e.g. 802.11 or cellular network), the Public Switched Telephone Network (PSTN) network, ad hoc networks, personal area networks (e.g. Bluetooth®) or other combinations or permutations of network protocols and network types. Such network(s) may include a single local area network (LAN) or wide-area network (WAN), or combinations of LANs or WANs, such as the Internet. In addition, access network 100 may comprise a virtual local area network (VLAN).

As those skilled in the art will readily appreciate, various aspects described throughout this disclosure may be extended to other telecommunication systems, network architectures, and communication standards. By way of example, various aspects may be extended to other Universal Mobile Telecommunications System (UMTS) systems such as Time Division Synchronous Code Division Multiple Access (TD-SCDMA), High Speed Downlink Packet Access (HSDPA), High Speed Uplink Packet Access (HSUPA), High Speed Packet Access Plus (HSPA+) and Time-Division CDMA (TD-CDMA). Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), Institute of Electrical and Electronics Engineers (IEEE) 802.11 (Wi-Fi), IEEE 802.16 (WiMAX®), IEEE 802.20, Ultra-Wideband (UWB), Bluetooth, and/or other suitable systems. The actual telecommunication standard, network architecture, and/or communication standard employed will depend on the specific application and the overall design constraints imposed on the system. The various devices coupled to the access network 100 and/or core network 102 (e.g. user terminals 120) may be coupled to the networks via one or more wired or wireless connections, as may any network devices of access network 100.

Moreover, the one or more user terminals 120 may each include a personal computer, such as a desktop computer, laptop computer, tablet, or other computing device, which may include a processing device or one or more processing modules for executing one or more instructions stored on a computer-readable medium. Additionally or alternatively, the one or more user terminals may include one or more set-top boxes or set-top units that may be configured to process communication signals or packets associated with one or more packet streams. Furthermore, the one or more user terminals 120 may include one or more mobile devices, which may be known to those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology.

In some examples, one or more user terminals 120 may comprise an end user group 118 communicatively coupled to access network 100 via a residential gateway 110, which may be configured to perform deep packet inspection ("DPI") and identify and prioritize one or more flows associated with one or more services corresponding to the user terminals 120. For example, in FIG. 1, such services may include a first service 114 and a second service 116, one or both of which may include applications, programs, or other processes run by the user terminals 120 that communicate with a core network 102 via access network 100. In an aspect, such applications, programs, or other processes may include, but are not limited to, streaming media (e.g. audio, video, etc.), file transfer programs that download or upload data packets from/to core network 102 (e.g. torrent software), telephonic services (e.g. Voice-Over Internet Protocol (VoIP) services) or any other computer-executable process that utilizes access network 100 to communicate data.

In an additional aspect, a user may utilize one or more control programs (e.g. running on user terminal 120) to indicate priority information associated with first service 114 and second service 116. The user may indicate that first service 114 is of a higher priority than the second service 116. For example, a father who is such a user may indicate via a control program on a user terminal 120 that his streaming sports media service (first service 114) is of higher priority than his children's music streaming service (second service 116). Based on this input, the user terminal 120 may transmit one or more data or control packets to residential gateway 110 that indicate that the first service 114 and its associated packet flow have a first priority and that second service 116 and its associated packet flow have a second priority that is lower than the first priority. Additionally, for purposes of the present disclosure, though only a first service 114 and second service 116 are illustrated in FIG. 1, any number of services may be run by user terminals 120, each of which may be identified and prioritized by a user.

Upon receiving the data or control packets and priority information, the residential gateway 110 may identify the packet flows associated with first service 114 and/or second service 116 and may modify one or more packets of packet flows associated with one or both of these services to indicate the priority information. For example, the residential gateway 110 may indicate a relative priority by setting or modifying a bit value in a layer 2 header (e.g. a Canonical Format Identifier (CFI) bit) or a bit of any field (e.g. a differentiated services code point (DSCP) bit of a DiffServ field, a priority code point (PCP) bit or the like) to indicate that a particular packet stream and its associated packets are eligible to be altered (e.g. dropped, queued, buffered, marked for retransmission, or otherwise delayed, such as by rate limiting or rate shaping) in the event of network congestion.

Residential gateway 110 may then transmit the modified packet or packets upstream to a network device, e.g. an optical line terminal (OLT) 108, which may in turn transmit the modified packets and the appended priority information upstream to one or more network elements 106 and/or a router 104. Alternatively or additionally, residential gateway 110 may identify the packet flows and generate and transmit a broadcast signal to the other nodes of access network 100 (e.g. one or more network elements 106, one or more other OLTs 108, or one or more routers 104) that includes priority information associated with the packet flows corresponding to first service 114 and/or second service 116.

Upon receiving the modified packet(s) and/or broadcast signals, network elements 106 and/or router 104 may store the priority information and, where an indication of network congestion is obtained by these network devices, the network devices may alter (e.g. drop, queue, buffer, mark for retransmission, or otherwise delay, such as by rate limiting or rate shaping) one or more packets associated with one or more packet flows based on the stored priority information.

Furthermore, network element 106, optical line terminal 108, and/or residential gateway 110 of FIG. 1 may include one or more of any type of network device, such as an optical network unit (ONU), splitter, access point, a macro cell, including a base station (BS), node B, eNodeB (eNB), a relay, a peer-to-peer device, an authentication, authorization and accounting (AAA) server, a mobile switching center (MSC), a radio network controller (RNC), or a low-power access point, such as a picocell, femtocell, microcell, a switching device, routing device, or any other network device of an access network known to one of ordinary skill in the art. Additionally, for purposes of the present disclosure, the term "upstream" may designate a direction of communication or network architecture originating at a point closer to end user group 118 and moving toward core network 102. This direction is indicated by upstream directional arrow 122. Likewise, for purposes of the present disclosure, the term "downstream" may designate a direction of communication or network architecture originating at a point closer to core network 102 moving toward end user group 118. This direction is indicated by downstream directional arrow 124. Furthermore, though access network 100 is depicted in FIG. 1 as a single communication path between core network 102 and end user group 118, each upstream network device may communicate with a plurality of downstream network devices, for example, such that a tree network architecture is achieved. In other words, router 104 may communicate with a plurality of downstream network elements 106, each of the plurality of network elements 106 may communicate with a plurality of downstream optical line terminals 108, which may each communicate with a plurality of residential gateways 110 (or ONUs).

Figure 2:
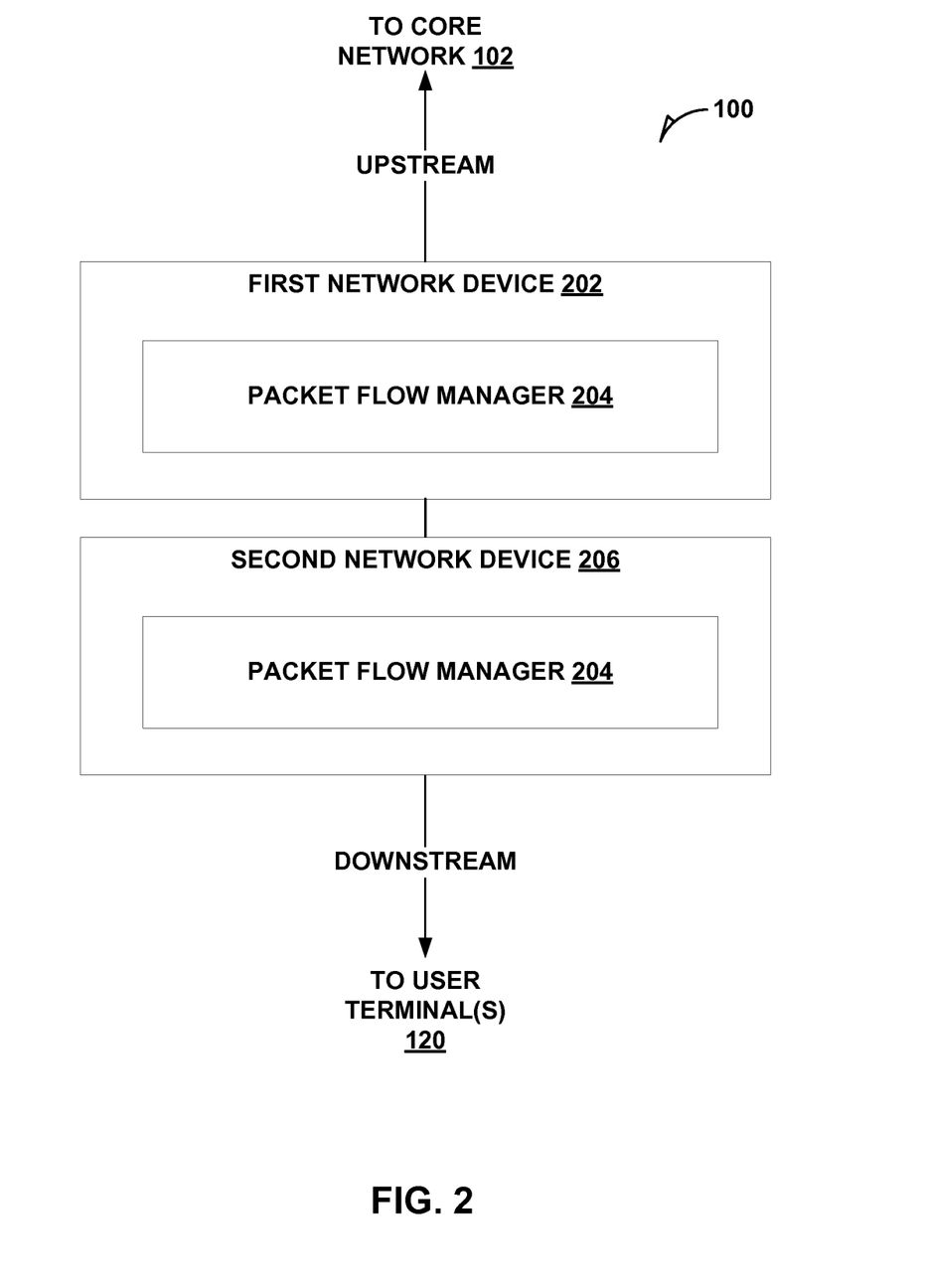
FIG. 2 is a block diagram illustrating example network devices according to the present disclosure.

FIG. 2 is a block diagram illustrating a generalized network architecture according to an example of the present disclosure. For example, first network device 202 may include any access network device of FIG. 1 (e.g. router 104, network elements 106, OLT 108, and/or residential gateway 110), though it may include other network devices not shown in FIG. 1 but known by those of ordinary skill in the art. Furthermore, second network device 206 may include any network device downstream of first network device 202. For example, in an optical network configuration, first network device 202 may be OLT 108 and second network device 206 may be residential gateway 110 of FIG. 1. Alternatively, in another example, first network device 202 may be a network element 106 and second network device 206 may be an OLT 108 of FIG. 1. Generally, however, first network device 202 may be any upstream network device in relation to second network device 206. Furthermore, first network device 202 and/or second network device 204 may include a packet flow manager 204, which may be configured to provide distributed packet flow control throughout an access network. Packet flow manager 204, as described in detail below with respect to FIG. 3, may be configured to identify one or more packet flows, receive and process priority information, and perform one or more actions (e.g. drop, queue, suspend) on one or more packets of the packet flows.

Figure 3:
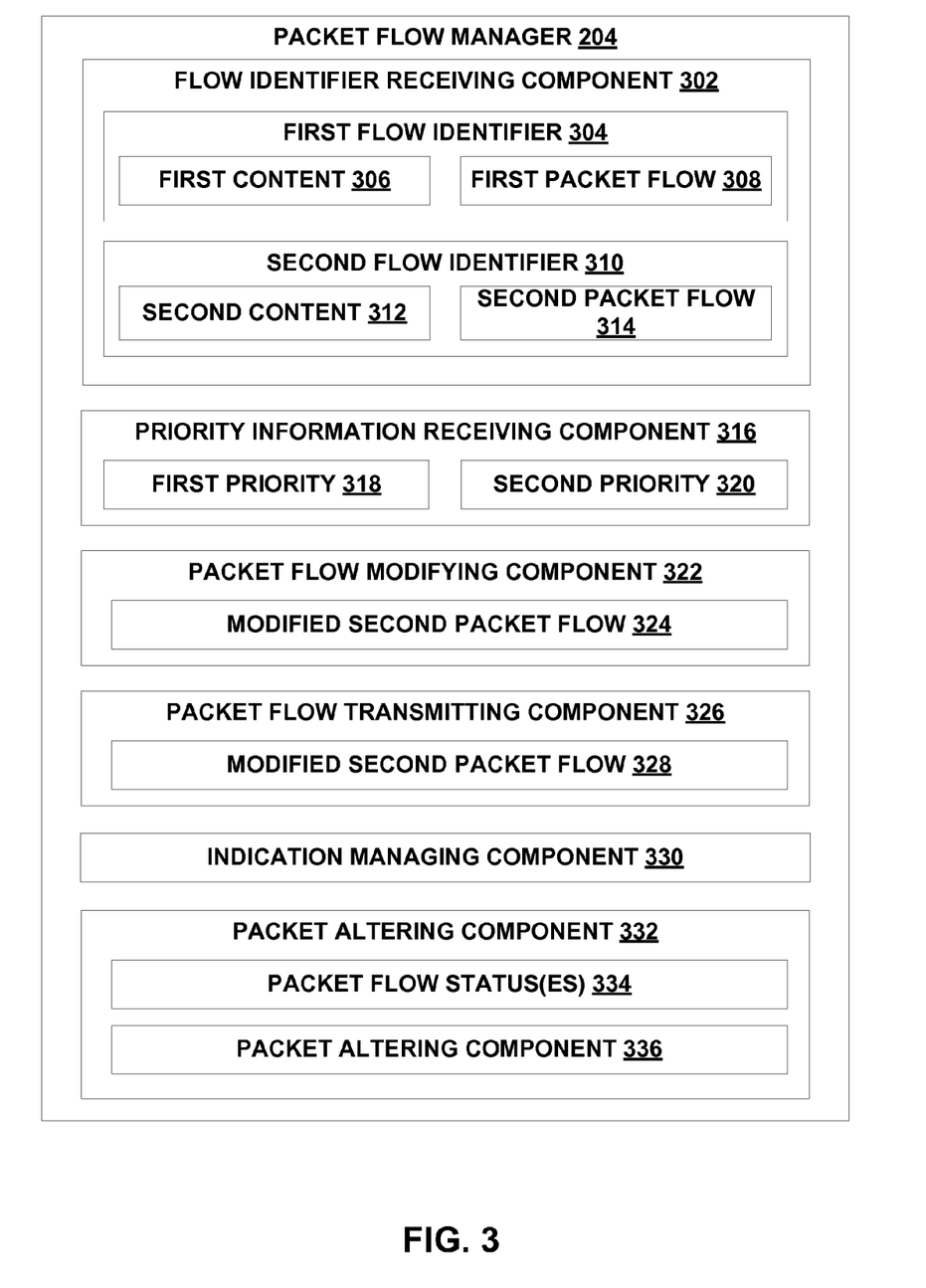
FIG. 3 is a block diagram of an example packet flow manager according to the present disclosure.

FIG. 3 is a block diagram illustrating an example packet flow manager 204 associated with one or more network devices (e.g. first network device 202 and/or second network device 206) of access network 100 of FIGS. 1 and/or 2. In an aspect, packet flow manager 204 may include one or more sub-components that are configured to perform one or more acts associated with methodologies described herein. In some examples, packet flow manager 204 may include a flow identifier receiving component 302, which may be configured to receive one or more flow identifiers that identify the contents of one or more packet flows and segregate the packet flows according to this identification. For example, flow identifier receiving component 302 may be configured to receive a first flow identifier 304 that identifies a first content 306 of a first packet flow 308 and a second flow identifier 310 that identifies a second content 312 of a second packet flow 314.

In an aspect, where packet flow manager 204 is located at a first network device (e.g. first network device 202), flow identifier receiving component 302 may receive the one or more flow identifiers from a second network device (e.g. second network device 204), which may generate the one or more flow identifiers (e.g. first flow identifier 304 and second flow identifier 206). In some examples, first content 306 and second content 312 may indicate a content, respectively, of each of first packet flow 308 and second packet flow 314, which may include content or data type associated with one or more applications, programs, or other processes associated with a flow associated with one or more user terminals. As such, first content 306 and/or second content 312 may include, but are not limited to, streaming media (e.g. audio, video, etc.), file transfer programs that download or upload data packets from/to core network 102 (e.g. torrent software), telephonic services (e.g. Voice-Over Internet Protocol (VoIP) services) or any other computer-executable process that utilizes access network 100 to communicate data.

Additionally, flow identifier receiving component 302 may include a priority information receiving component 316, which may be configured to receive priority information associated with one or more packet flows. For example, where packet flow manager 204 is located at a first network device (e.g. first network device 202) priority information receiving component 316 may receive the priority information from a second network device (e.g. second network device 204), which may generate the priority information. In some examples, this priority information may comprise a first priority 318 corresponding to first packet flow 308 and its related first content 306 and a second priority 320 corresponding to second packet flow 314 and its related second content 312. Furthermore, such priority information may indicate that the first content 306 has a first priority 318 and that second content 312 has a second priority 320 that is lower than first priority 318. Alternatively, the priority information may indicate that the first content 306 has a first priority 318 and that second content 312 has a second priority 320 that is higher than first priority 318.

In addition, packet flow manager 204 may include a packet flow modifying component 322, which may be configured to modify one or more packets of one or more packet flows (e.g. first packet flow 308 or second packet flow 314), for example, to indicate priority information associated with the packets of the one or more packet flows. In an aspect, packet flow modifying component 322 may be configured to set a priority flag, a drop flag, a drop status, packet flow status, and/or modify a bit field or associated bit value in a layer 2 header (e.g. CFI bit) or a bit of any field (e.g. a DSCP bit of a DiffServ field, or the like) to indicate that a particular packet stream and its associated packets are eligible to be altered in the event of network congestion. This priority flag, a drop flag, and/or modified a bit field or associated bit value may indicate to one or more network devices of an access network (e.g. access network 100), via the modified packet(s) that packets associated with a lower-priority packet flow may be altered (e.g. dropped, queued, buffered, marked for retransmission, or otherwise delayed, such as by rate limiting or rate shaping) before the packets of a higher-priority packet, for example, where network congestion exists.

Additionally, packet flow modifying component 322 may be configured to modify one or more packets of a packet flow upon obtaining an indication that a packet flow has stopped. For example, packet flow modifying component 322 may modify one or more packets of a packet flow to indicate that the packet flow should not be altered (e.g. dropped, queued, buffered, marked for retransmission, or otherwise delayed, such as by rate limiting or rate shaping) before the packets of a higher-priority packet, for example, where network congestion exists, as communication over the packet flow has halted or ceased.

Furthermore, packet flow manager 204 may include a packet flow transmitting component 326, which may be configured to transmit one or more modified packet flows, which may include a modified second packet flow 328, for example, to one or more upstream or downstream network devices. Alternatively or in addition, packet flow transmitting component 326, may be configured to transmit one or more broadcast messages to one or more network devices indicating priority information.

Additionally, packet flow manager 204 may include an indication managing component 330, which may be configured to obtain and process one or more indications related to communications on an access network. For example, in an aspect, indication managing component 330 may be configured to obtain one or more indications of network congestion, which may be generated by a network device housing packet flow manager 204 or may be received via a message from another network device. In some examples, indication managing component 330 may comprise switch silicon or other network control circuitry that may be configured to detect a network congestion condition. For example, where network load, bandwidth, latency, or related information reaches a threshold congestion level, indication managing component 330 may generate such an indication of network congestion and/or may receive such an indication generated by another network device. Likewise, in an aspect, where an access network returns to a uncongested state from a state of network congestion, indication managing component 330 may be configured to generate an indication that the network is no longer in a state of network congestion. Moreover, indication managing component 330 may be configured to obtain an indication that a packet flow has stopped, for example, where a user has terminated a flow or associated process on a user terminal. Furthermore, indication managing component 330 may be configured to communicate with one or more routing components or devices (e.g. routers or splitters) to indicate that network congestion exists. In some examples of the present disclosure, rather than altering (e.g. dropping, queuing, buffering, marking for retransmission, or otherwise delaying, such as by rate limiting or rate shaping) the packet flows, these routing components or devices may be configured to reroute packets of the one or more packet flows to a route of less congestion than a current route.

In addition, packet flow manager 204 may include a packet altering component 332, which may be configured to alter (e.g. drop, queue, buffer, mark for retransmission, or otherwise delay, such as by rate limiting or rate shaping) a packet flow, for example, based on an indication of network congestion, which may be determined, for example, by switch silicon in one or more network devices. Furthermore, packet altering component 332 may store packet flow statuses 334 associated with one or more packet flows (e.g. first packet flow 308 and second packet flow 314, or more packet flows of an access network (nor shown)). Such packet flow statuses 334 may include relative priority information or an indication that a packet flow is active or suspended such that when a network device containing packet flow manager 204 receives a packet associated with a flow, the packet altering component may cross-reference the packet flow status to determine whether the received packet or packets of the packet flow should be transmitted on to an end user or the core network via another network device or whether the packet flow should be altered. Additionally, packet altering component may include a altering component 336, which may be configured to alter (e.g. drop, queue, buffer, mark for retransmission, or otherwise delay, such as by rate limiting or rate shaping) one or more received packets based on its packet flow status 334 (e.g. priority information relative to other active packet flows)

For example, in an aspect, packet altering component 332 may receive priority information indicating that a second priority 320 of a second packet flow 314 is lower than a first priority 318 associated with a first packet flow 308. When the network device housing the packet flow manager 204 subsequently obtains an indication of network congestion and determines that one or more packets should be altered, the packet altering component 332 may alter (e.g. drop, queue, buffer, mark for retransmission, or otherwise delay, such as by rate limiting or rate shaping) one or more packets of second packet flow 314 before altering any packets of first packet flow 308 based on the priority information stored as packet flow status 334.

Figure 4A:
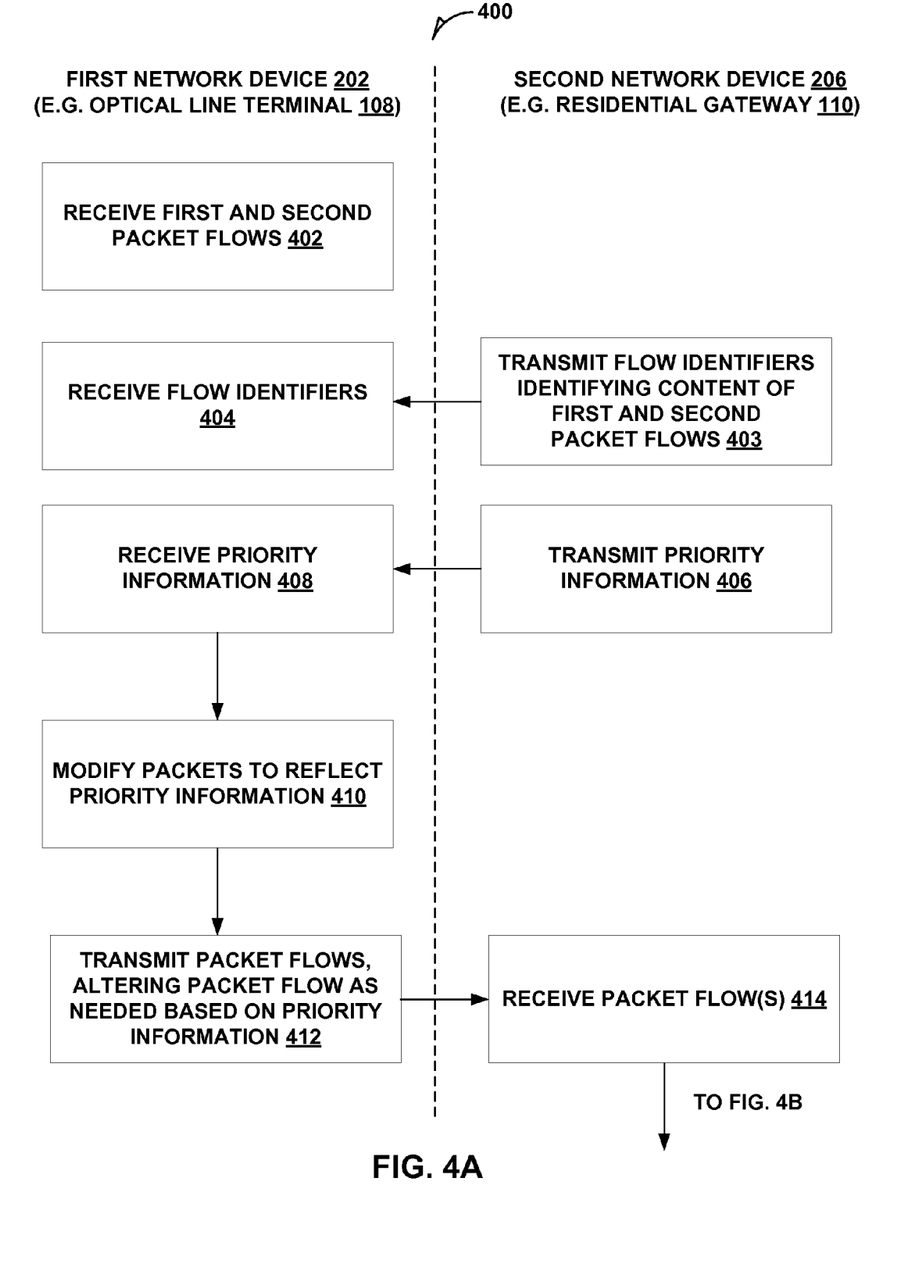
FIG. 4A is a flow diagram illustrating an example method and message flow for improved packet flow control, according to various techniques of the present disclosure.
Figure 4B:
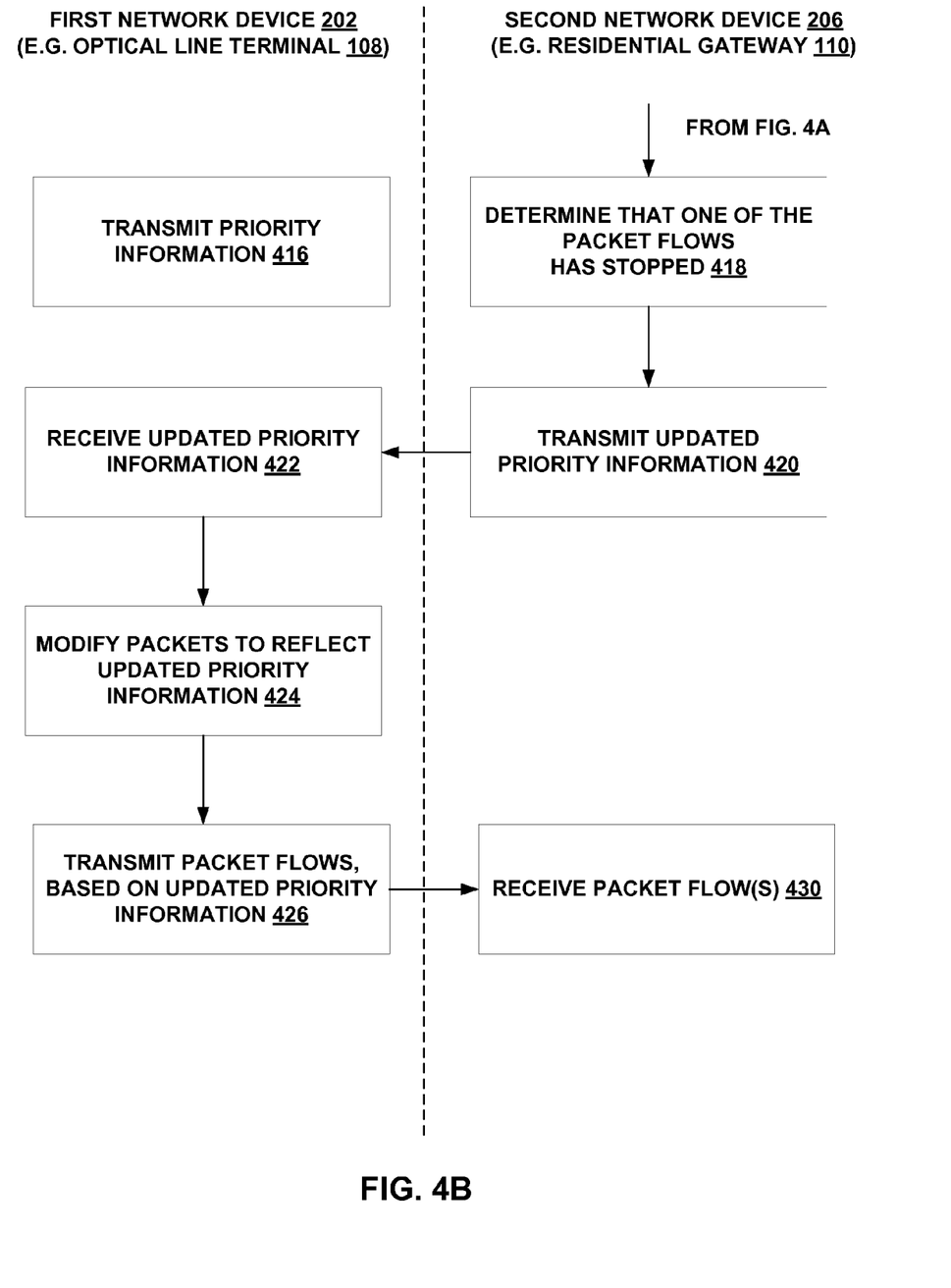
FIG. 4B is a flow diagram continuing from FIG. 4A and illustrating an example method and message flow for improved packet flow control, according to various techniques of the present disclosure.

FIG. 4 (comprising FIGS. 4A and FB) is a flowchart illustrating an example method 400 for distributed packet flow management in access networks according to examples of the present disclosure. FIGS. 4A and 4B provide the example methodology as performed by a first network device and a second network device, which may comprise first network device 202 and second network device 206 of FIG. 2, respectively. In an example, the first network device may comprise optical line terminal 108 of FIG. 1 and the second network device may comprise residential gateway 110 of FIG. 1. Generally, however, methodology 400 may be performed by any first network device 202 and second network device 206 of FIG. 2, which may comprise any network device of an access network (e.g. access network 100 of FIG. 1).

Turning to FIG. 4A, in an aspect, the first network device 202 (e.g. of FIG. 2) may receive packets of first and second packet flows at block 402, which may originate from one or more downstream user terminals of the access network or from one or more network devices downstream or upstream in relation to first network device 202. In addition, at block 403, second network device 206 may transmit one or more flow identifiers identifying the content of a first and/or second packet flow. Furthermore, at block 404, the first network device 202 may receive flow identifiers (e.g. first flow identifier and second flow identifier) identifying the content of the first and second packet flows. In an aspect the flow identifiers may be received concurrently with the first and second packet flows, for example, as a portion of a header to first and/or second packet flows.

Additionally, at block 406, second network device 206 may receive, generate, and/or transport priority information associated with the first and second packet flows to first network device 202. In a non-limiting aspect, this priority information may be transmitted via a modified packet, as a packet header, a bit or field value, or as a broadcast message. Likewise, at block 408, first network device 202 may receive this priority information. After receiving the priority information at block 408, the first network device may, in a non-limiting aspect of methodology 400, modify one or more packets to reflect the priority information at block 410. In an aspect, this may include modifying one or more layer 2 header bits or other header fields or bits (e.g. DSCP, PCP, CFI bits, etc.) or flagging the packet flow as drop-eligible or low- or high-priority.

In addition, at block 412, first network device 202 may transmit the one or more packet flows to one or more other network devices (downstream or upstream) and/or may alter (e.g. drop, queue, buffer, mark for retransmission, or otherwise delay, such as by rate limiting or rate shaping) one or more packets of one or more packet flows as needed (e.g. based on an indication of network congestion) based on the priority information associated with the flow(s). Furthermore, at block 414, second network device 206 may receive the packet flows transmitted by first network device 202, which may include one or more modified packets that indicate priority information. In an alternative aspect, the transmitted packet flows may be received by a network device other than second network device 206 (such as an upstream network component, as the case may be).

Turning to FIG. 4B, which is a continuation of methodology 400 of FIG. 4A, in an additional or alternative aspect, at block 416, the first network device 202 may transmit the priority information separately from the packet flows, such as, but not limited to, as a broadcast message, which may, in a non-limiting aspect, include a multicast or unicast message to one or more other network devices.

Furthermore, at block 418, second network device 206 may determine that one or more of the packet flows has stopped based, for example, on obtaining an indication that the packet flow or flows has stopped. Upon determining that the one or more packet flows has stopped, the second network device 206 (or any other network device of the access network) may modify or otherwise update priority information associated with the flow or flows and transmit the updated priority information to one or more upstream or downstream network devices, such as first network device 202 at block 420. Again, this updated priority information may be included in a modified packet of one or more packet flows or may be transmitted as a broadcast message. Correspondingly, at block 422, the first network device 202 (or one or more other network devices) may receive the updated priority information and may, at block 424, modify one or more packets to reflect the updated priority information. Additionally, at block 426, the first network device may transmit the packet flows, which may include one or more modified packet flows, based on the updated priority information. Also, as described in detail above, at block 426, the transmission of the updated priority information may comprise a modified packet header or a broadcast message indicating the updated priority information. This updated priority information, and optionally the packet flows, may be received by the second network device 406 (or other downstream or upstream network devices) at block 430. In this manner and in contrast to existing techniques, two or more network devices may be utilized to perform packet flow control at disparate network locations. As such, packet flow control may be optimized by distributed flow control based on priority information at multiple disparate network devices throughout an access network.

Figure 5:
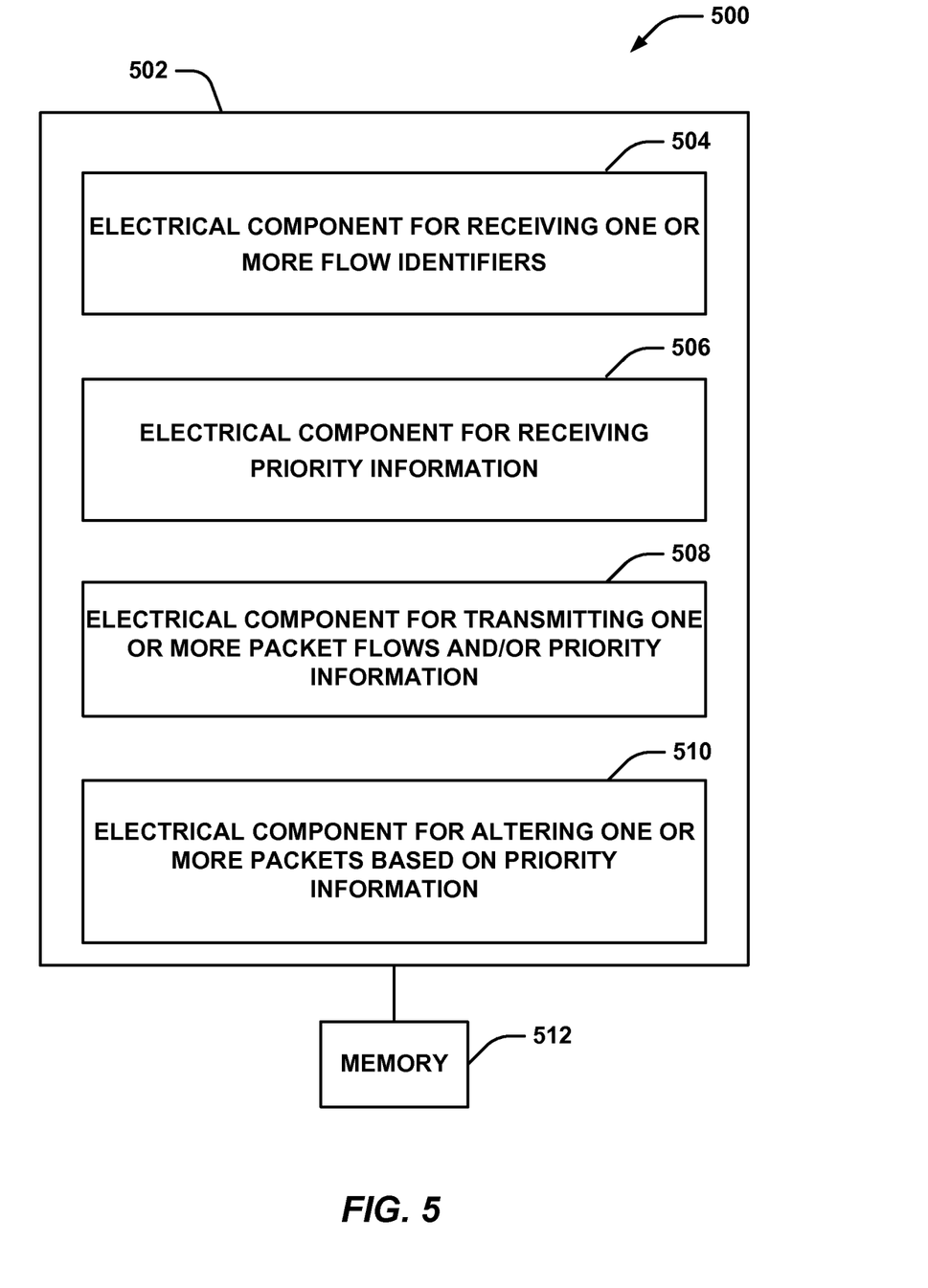
FIG. 5 is a block diagram illustrating a logical grouping of electrical components according to aspects of the present disclosure.

Referring to FIG. 5, a block diagram illustrating an example system 500 is displayed for distributed packet flow control on an access network. For example, system 500 can reside at least partially within one or more computing or processing devices, which may include, in a non-limiting aspect, any network device described herein, including, but not limited to, first network device 202 or second network device 206 of FIG. 2 and/or router 104, network elements 106, OLT 108, and/or residential gateway 110 of FIG. 1.

It is to be appreciated that system 500 is represented as including functional blocks, which can be functional blocks that represent processes implemented by a processor, software, or combination thereof (e.g., firmware). System 500 includes a logical grouping 502 of electrical components that can act in conjunction. For instance, logical grouping 502 can include an electrical component 504 for receiving one or more flow identifiers associated with one or more flows between an access network, core network, and/or a user terminal of an end user group. In an aspect, electrical component 504 may comprise flow identifier receiving component 302 (FIG. 3). In addition, logical grouping 502 can include an electrical component 506 for receiving priority information. In an aspect, electrical component 506 may comprise priority information receiving component 316 (FIG. 3). In addition, logical grouping 502 can include an electrical component 508 for transmitting one or more packet flows and/or priority information. In an aspect, electrical component 508 may comprise packet flow transmitting component 326 (FIG. 3). Furthermore, logical grouping 502 can include an electrical component 512 for altering one or more packets of one or more packet flows based on priority information. In an aspect, electrical component 510 may comprise packet altering component 332 (FIG. 3).

Additionally, system 500 can include a memory 512 that retains instructions for executing processes associated with the electrical components 504, 506, 508, and 510, stores data used or obtained by the electrical components 504, 506, 508, and 510, etc. While shown as being external to memory 512, it is to be understood that one or more of the electrical components 504, 506, 508, and 510 can exist within memory 512. In one example, electrical components 504, 506, 508, and 510 can comprise at least one processor, or each electrical component 504, 506, 508, and 510 can be a corresponding module of at least one processor. Moreover, in an additional or alternative example, electrical components 504, 506, 508, and 510 can be a computer program product including a computer readable medium, where each electrical component 504, 506, 508, and 510 can be corresponding code.

Figure 6:
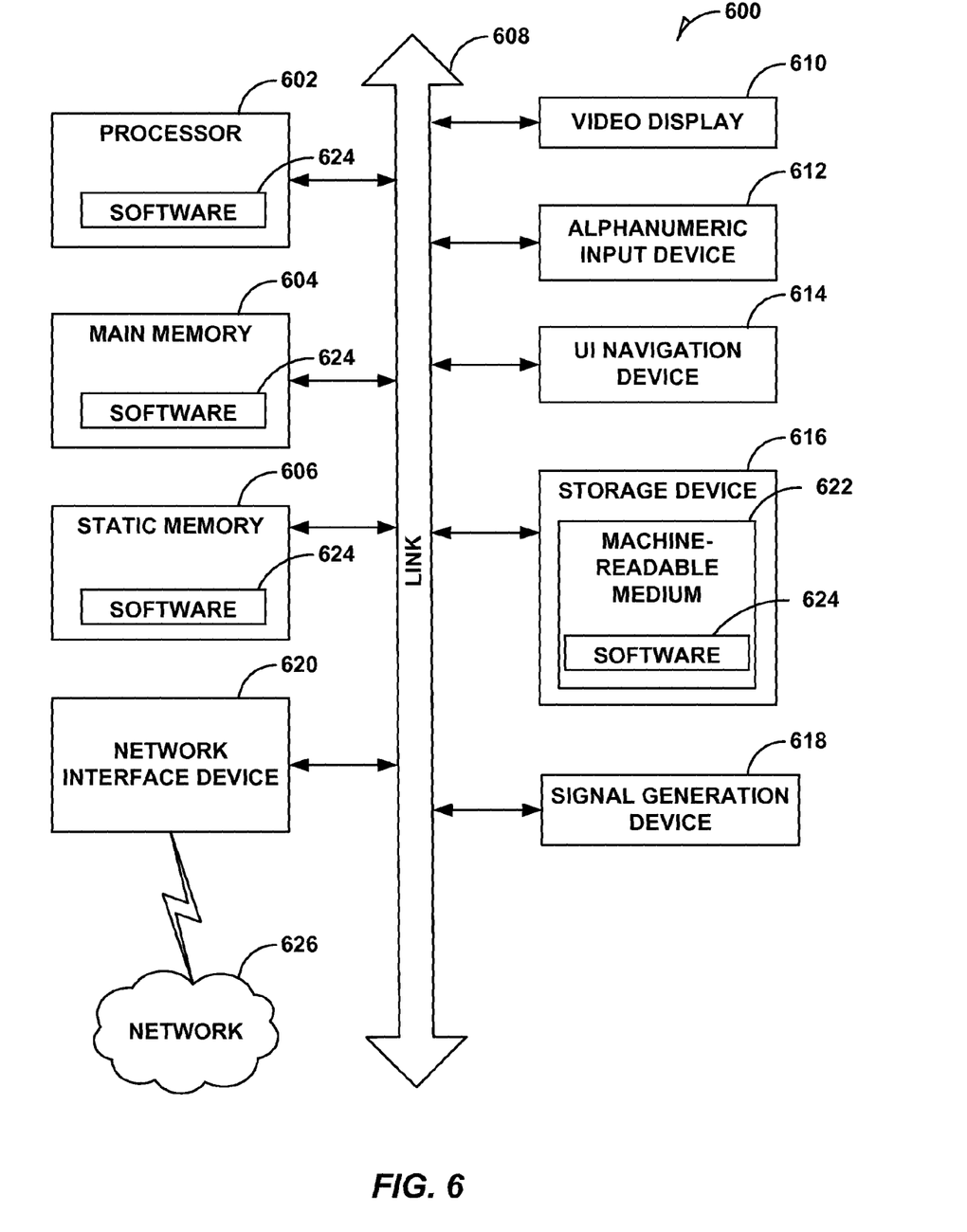
FIG. 6 is a block diagram illustrating an example machine in the example form of a computer system, within which a set or sequence of instructions for causing the machine to perform any one of the methodologies discussed herein may be executed, according to various techniques of the present disclosure.

FIG. 6 is a block diagram illustrating a machine in the example form of a computer system 600, which may represent one or more of the devices introduced above, including, but not limited to, one or more network devices (e.g. first network device 202 or second network device 206 of FIG. 2, or any of the access network devices of FIG. 1). Within the example computer system 600 are a set or sequence of instructions for causing the machine to perform any one of the methodologies discussed herein may be executed, according to an example embodiment. In alternative embodiments, the machine operates as a standalone device or may be connected (e.g. networked) to other machines. In a networked deployment, the machine may operate in the capacity of either a server or a client machine in server-client network environments, or it may act as a peer machine in peer-to-peer (or distributed) network environments. The machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

Example computer system 600 includes at least one processor 602 (e.g. a central processing unit (CPU), a graphics processing unit (GPU) or both, processor cores, computer nodes, etc.), a main memory 604 and a static memory 606, which communicate with each other via a link 608 (e.g. bus). The computer system 600 may further include a video display unit 610, an alphanumeric input device 612 (e.g. a keyboard), and a user interface (UI) navigation device 614 (e.g. a mouse). In one embodiment, the video display unit 610, input device 612 and UI navigation device 614 are incorporated into a touch screen display. The computer system 600 may additionally include a storage device 616 (e.g. a drive unit), a signal generation device 618 (e.g. a speaker), a network interface device 620, and one or more sensors (not shown), such as a global positioning system (GPS) sensor, compass, accelerometer, or other sensor.

The storage device 616 includes a machine-readable medium 622 on which is stored one or more sets of data structures and instructions 624 (e.g. software) embodying or utilized by any one or more of the methodologies or functions described herein. The instructions 624 may also reside, completely or at least partially, within the main memory 604, static memory 606, and/or within the processor 602 during execution thereof by the computer system 600, with the main memory 604, static memory 606, and the processor 602 also constituting machine-readable media.

While the machine-readable medium 622 is illustrated in an example embodiment to be a single medium, the term "machine-readable medium" may include a single medium or multiple media (e.g. a centralized or distributed database, and/or associated caches and servers) that store the one or more instructions 624. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or corresponding to such instructions. The term "machine-readable medium" shall accordingly be taken to include, but not be limited to, solid-state memories, and optical and magnetic media. Specific examples of machine-readable media include non-volatile memory, including, by way of example, semiconductor memory devices (e.g. Electrically Programmable Read-Only Memory (EPROM), Electrically Erasable Programmable Read-Only Memory (EEPROM)) and flash memory devices;

magnetic disks such as internal hard disks and removable disks; magneto-optical disks; and CD-ROM and DVD-ROM disks.

The instructions 624 may further be transmitted or received over a communications network 626 using a transmission medium via the network interface device 620 utilizing any one of a number of well-known transfer protocols (e.g. HTTP). Examples of communication networks include a local area network (LAN), a wide area network (WAN), the Internet, mobile telephone networks, Plain Old Telephone (POTS) networks, and wireless data networks (e.g. Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Examples, as described herein, may include, or may operate on, logic or a number of modules, modules, or mechanisms. Modules are tangible entities capable of performing specified operations and may be configured or arranged in a certain manner. In an example, circuits may be arranged (e.g. internally or with respect to external entities such as other circuits) in a specified manner as a module. In an example, the whole or part of one or more computer systems (e.g. a standalone, client or server computer system) or one or more hardware processors may be configured by firmware or software (e.g. instructions, an application portion, or an application) as a module that operates to perform specified operations. In an example, the software may reside (1) on a non-transitory machine-readable medium or (2) in a transmission signal. In an example, the software, when executed by the underlying hardware of the module, causes the hardware to perform the specified operations.

Accordingly, the terms "component," "components," "module" and "modules" are understood to encompass a tangible entity, be that an entity that is physically constructed, specifically configured (e.g. hardwired), or temporarily (e.g. transitorily) configured (e.g. programmed) to operate in a specified manner or to perform part or all of any operation described herein. Considering examples in which modules are temporarily configured, one instantiation of a module may not exist simultaneously with another instantiation of the same or different module. For example, when the modules comprise a general-purpose hardware processor configured using software, the general-purpose hardware processor may be configured as respective different modules at different times. Accordingly, software may configure a hardware processor, for example, to constitute a particular module at one instance of time and to constitute a different module at a different instance of time.

Additional examples of the presently described method, system, and device embodiments include the following, non-limiting configurations. Each of the following non-limiting examples may stand on its own, or may be combined in any permutation or combination with any one or more of the other examples provided below or throughout the present disclosure. The preceding description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments.

The invention claimed is:

1. A method of controlling packet flow in a network, the method comprising:
    transmitting, by a first network device to a second network device, a first packet flow and a second packet flow;
    receiving, at the first network device, a first flow identifier that identifies a first application corresponding with a first content of the first packet flow and a second flow identifier that identifies a second application corresponding with a second content of the second packet flow,
    wherein the first flow identifier and the second flow identifier are generated by the second network device, and wherein the first application corresponding with the first content of the first packet flow and the second application corresponding with the second content of the second packet flow are identified by the second network device using deep packet inspection;
    receiving, at the first network device, a priority information indicating that the first application has a first priority and that the second application has a second priority that is lower than the first priority, wherein the first priority and the second priority are generated by the second network device; and
    transmitting, by the first network device, the first packet flow and a modified second packet flow that includes the priority information.

2. The method of claim 1, further comprising:
    obtaining an indication of network congestion; and altering the second packet flow in response to obtaining the indication.

3. The method of claim 2, wherein altering the second packet flow comprises one or more of dropping, queuing, buffering, marking for retransmission, delaying, rate limiting, or rate shaping one or more packets associated with the second packet flow.

4. The method of claim 1, further comprising modifying, at the first network device, the second packet flow to include the priority information.

5. The method of claim 4, wherein modifying the second packet flow further comprises modifying at least one bit in a field of the second packet flow.

6. The method of claim 5, wherein modifying the at least one bit in a field of the second packet flow further comprises modifying a drop eligible indicator bit of the second packet flow.

7. The method of claim 5, wherein modifying at least one bit in a field of the second packet flow further comprises modifying a differentiated services code point bit of the second packet flow.

8. The method of claim 1, further comprising:
    obtaining an indication that the first packet flow has stopped; and
    modifying, at the first network device, the second packet flow to indicate that the second packet flow should not be dropped in response to obtaining an indication of network congestion.

9. The method of claim 1, further comprising transmitting the priority information indicating that the first application has the first priority and that the second application has the second priority that is lower than the first priority.

10. The method of claim 9, wherein transmitting the priority information further comprises transmitting the priority information to one or more upstream network elements.

11. The method of claim 9, wherein transmitting the priority information further comprises transmitting the priority information via one or more of a broadcast message, unicast message, or multicast message.

12. The method of claim 1, wherein the first network device is an optical line terminal device.

13. The method of claim 1, wherein the second network device is a residential gateway.

14. A network device for controlling packet flow in a network, comprising one or more modules that are configured to perform the acts of:
 transmitting, by the network device to a second network device, a first packet flow and a second packet flow:
 receiving, at the network device, a first flow identifier that identifies a first application corresponding with a first content of the first packet flow and a second flow identifier that identifies a second application corresponding with a second content of the second packet flow, wherein the first flow identifier and the second flow identifier are generated by the second network device, and wherein the first application corresponding with the first content of the first packet flow and the second application corresponding with the second content of the second packet flow are identified by the second network device using deep packet inspection:
 receiving, at the network device, a priority information indicating that the first application has a first priority and that the second application has a second priority that is lower than the first priority, wherein the first priority and the second priority are generated by the second network device: and
 transmitting, by the network device, the first packet flow and the modified second packet flow that includes the priority information.

15. The network device of claim 14, further comprising one or more modules configured to perform the acts of:
 obtaining an indication of network congestion; and
 altering the second packet flow in response to receiving the indication based on the priority information.

16. The network device of claim 14, further comprising one or more modules configured to perform the act of modifying, at the network device, the second packet flow to include the priority information.

17. The network device of claim 16, wherein modifying the second packet flow further comprises modifying at least one bit in a field of the second packet flow.

18. The network device apparatus of claim 14, further comprising one or more modules configured to perform the acts of:
 obtaining an indication that the first packet flow has stopped; and modifying, at the network device, the second packet flow to indicate that the second packet flow should not be altered in response to obtaining an indication of network congestion.

19. The network device of claim 14, further comprising transmitting the priority information indicating that the first application has a first priority and that the second application has a second priority that is lower than the first priority.

20. At least one non-transitory machine readable medium comprising a plurality of instructions that in response to being executed on a computing device, causes the computing device to perform the acts of:
 transmitting, by a first network device to a second network device, a first packet flow and a second packet flow;
 receiving, at the first network device, a first flow identifier that identifies a first application corresponding with a first content of the first packet flow and a second flow identifier that identifies a second application corresponding with a second content of the second packet flow, wherein the first flow identifier and the second flow identifier are generated by the second network device, and wherein the first application corresponding with the first content of the first packet flow and the second application corresponding with the second content of the second packet flow are identified by the second network device using deep packet inspection;
 receiving, at the first network device, a priority information indicating that the first application has a first priority and that the second application has a second priority that is lower than the first priority, wherein the first priority and the second priority are generated by the second network device; and
 transmitting, by the first network device, the first packet flow and the modified second packet flow that includes the priority information.

21. The at least one non-transitory machine readable medium of claim 20, further comprising a plurality of instructions that in response to being executed on the computing device, causes the computing device to perform the acts of:
 obtaining an indication of network congestion; and
 altering the second packet flow in response to receiving the indication based on the priority information.

22. The at least one non-transitory machine readable medium of claim 20, further comprising a plurality of instructions that in response to being executed on the computing device, causes the computing device to perform the act of modifying, at the first network device, the second packet flow to include the priority information.

23. The at least one non-transitory computer readable medium of claim 22, wherein modifying the second packet flow further comprises modifying at least one bit in a field of the second packet flow.

24. The at least one non-transitory machine readable medium of claim 20, further comprising a plurality of instructions that in response to being executed on the computing device, cause the computing device to perform the acts of:
 obtaining an indication that the first packet flow has stopped; and
 modifying, at the first network device, the second packet flow to indicate that the second packet flow should not be altered in response to obtaining an indication of network congestion.

25. The at least one non-transitory machine readable medium of claim 20, further comprising a plurality of instructions that in response to being executed on the computing device, causes the computing device to perform the act of transmitting the priority information indicating that the first application has the first priority and that the second application has the second priority that is lower than the first priority.

* * * * *